Patented Mar. 29, 1949

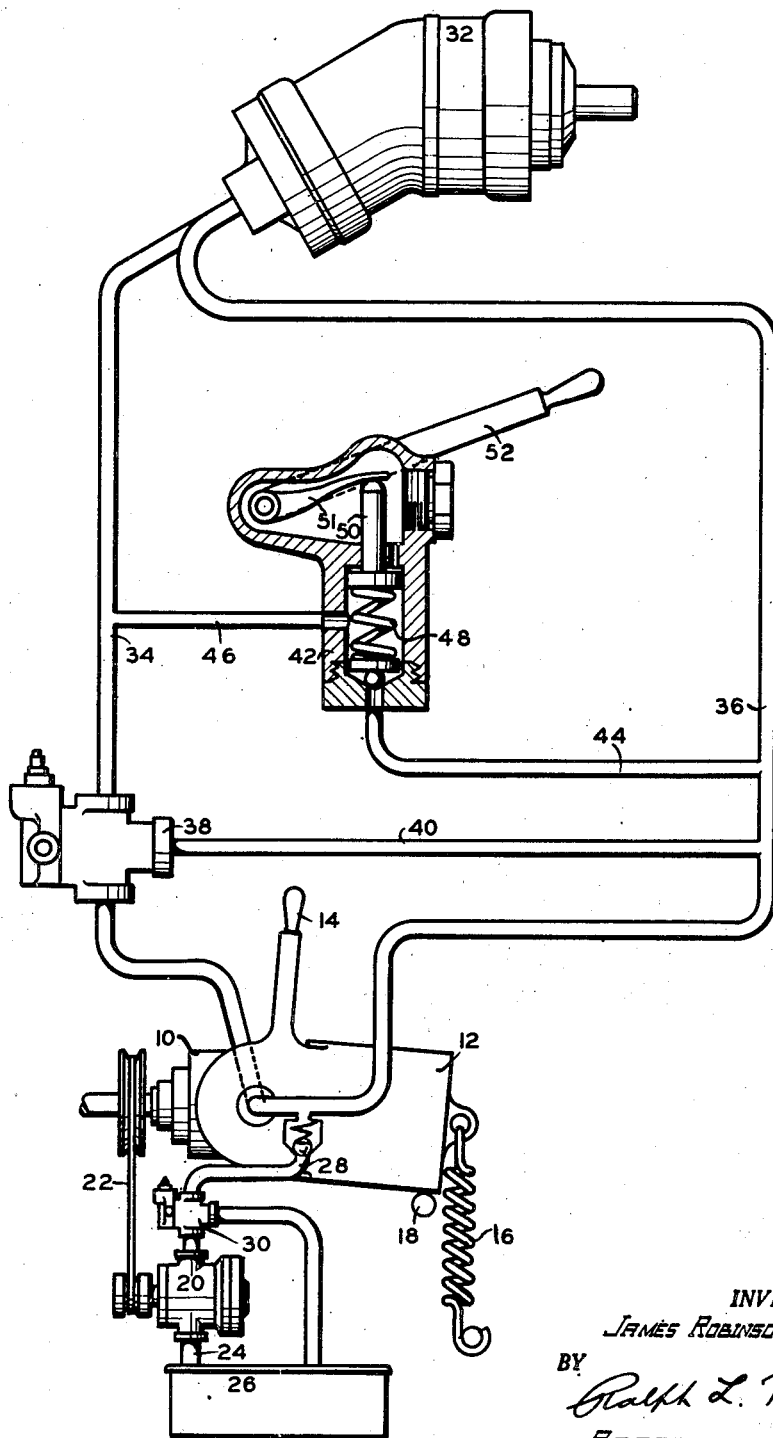

2,465,484

UNITED STATES PATENT OFFICE 2,465,484

HYDRAULIC POWER TRANSMISSION SYSTEM

James Robinson, Huntington Woods, Mich., assignor to Vickers Incorporated, Detroit, Mich., a corporation of Michigan Application November 15, 1945, Serial No. 628,684

4 Claims. (Cl. 60—53)

This invention relates to power transmissions, particularly to those of the type comprising two or more fluid pressure energy translating devices, one of which may function as a pump and another as a fluid motor.

The invention is more particularly concerned with a power transmission system having a variable displacement, reversible pump. It is a well-known characteristic of a properly constructed and efficient hydraulic transmission system that the driving relation between the pump and motor is very positive, even at extremely slow creeping speeds. Where control is obtained by varying the pump displacement, it is frequently difficult to provide a simple mechanism which will reliably position the pump-adjusting member in neutral position when it is desired to stop the fluid motor. In some applications of hydraulic transmission it is essential that even very slow creep be prevented when the pump-adjusting member is on neutral.

It is also frequently desirable to provide for additional functions which are not obtainable by merely adjusting or reversing the pump displacement. Among such conditions, frequently encountered are the need for free-wheeling of the fluid motor, for controlled hydraulic braking thereof, and for control of torque output.

It is an object of the present invention to provide a hydraulic transmission system having improved control means of exceedingly simple character to meet these problems.

Thus, it is an object of the present invention to provide for the elimination of creep when it is desired to stop the fluid motor and to do so by mechanism which is inexpensive in construction and certain and reliable in its operation.

Likewise, the invention seeks to provide for free-wheeling of the fluid motor and for controlled braking thereof while at the same time avoiding the addition of complex and expensive control mechanism and to do so at no sacrifice of reliability.

Further objects and advantages of the present invention will be apparent from the following description, reference being had to the accompanying drawing wherein a preferred form of the present invention is clearly shown.

In the drawing the single figure represents a diagrammatic view of a power transmission system incorporating a preferred form of the present invention.

Referring now to the drawing, a pump 10 of the reversible, variable displacement type may be driven by a suitable prime mover, not shown, and has an oscillatable yoke 12 which forms the displacement-adjusting member for the pump. Suitable means may be provided for variably positioning the yoke 12, a handle 14 being shown as diagrammatically representative thereof. The yoke 12 is biased to the position shown on the drawing by a spring 16 and normally rests against a stop 18 which positions the yoke slightly off its neutral position in the direction of reverse delivery. The amount of this reverse delivery may be insignificant if no reverse operation of the fluid motor is necessary, or it may be a small but significant value if operation of the motor slowly in a reverse direction is at times desirable.

The pump 10 is provided with a replenishing pump 20 driven therefrom by a belt drive 22. The pump 20 has a suction conduit 24 through which fluid may be drawn from a tank 26 and delivered by means of a conduit 28 to the return side of the pump 10, that is, that side which is normally the suction side during forward operation. A suitable low-pressure relief valve 30 is provided for limiting the replenishing pressure.

The pump 10 is connected in a closed circuit with a fluid motor 32 by means of a forward delivery conduit 34 and a return conduit 36. A suitable high-pressure relief valve 38 is mounted in the delivery conduit 34 to limit the pressure therein by discharging fluid to the return conduit 36 through a connection 40. There is also connected across the lines 34 and 36 a check valve 42 open to free flow from the line 36 to the line 34, conduits 44 and 46 being provided for this purpose. Suitable means are provided for introducing additional resistance to flow in the lines 44 and 45 at will under certain conditions. Conveniently this may take the form of a manually-adjustable spring 48 which normally rests lightly on the ball of the check valve 42 and which is provided with a slidable plunger 50 which may be depressed to varying degrees by a lever 51 operated by a handle 52.

In operation, with the pumps 10 and 20 running and with the yoke 12 in the position shown on the drawing, the fluid motor will not operate, although it can free-wheel under the action of any externally-applied force tending to drive it forwardly. Since the yoke 12 is in a position of small reverse displacement, fluid is delivered from pump 10 into conduit 36. Since the check valve 42 is open to free flow from conduit 36 to conduit 34, all of the fluid delivered by pump 12 will pass through the conduits 44 and 46 to the conduit 34 and return to the pump 10.

The fluid motor 32 may be started forwardly by shifting the yoke 12 counterclockwise past the neutral position. Thereafter the speed of pump 32 will depend upon the rate of delivery of pump 10 and can be varied at will. The motor 32 will drive forwardly against any resisting torque below that determined by the setting of relief valve 38 since check valve 42 prevents the escape of pressure fluid from the line 34 to the line 36.

Should the motor 32 be subjected to an overrunning force tending to drive it faster than the fluid delivered by pump 10, the motor can then free-wheel by delivering oil from line 36 through check valve 42 to line 34 in whatever quantity is necessary in excess of that delivered by pump 10. If it is desired to apply a braking force to the motor 32, the yoke 12 may be shifted to the position shown, and, while it is coasting to a stop, handle 52 may be depressed to cause pressure to build up in line 36 by the additional resistance to flow imposed on check valve 42 by the spring 48. Likewise, when the motor 32 is at rest, reverse operation thereof may be obtained by merely depressing the handle 52, and, when the pressure built up by check valve 42 is sufficient to overcome the load, the oil delivered by pump 10 in the reverse direction will then be blocked from flowing through the bypass 44—46 and, instead will pass through the motor 32, thus operating it in a reverse direction.

It will be understood that the transmission illustrated is shown in diagrammatic form only and that the customary housings and accessory equipment normally supplied with conventional hydraulic transmissions may be used with the present invention.

While the form of embodiment of the invention as herein disclosed constitutes a preferred form, it is to be understood that other forms might be adopted, all coming within the scope of the claims which follow.

What is claimed is as follows:

1. A hydraulic power transmission system comprising a reversible, variable displacement pump, a fluid motor, a closed circuit connecting the pump and motor, a shiftable control element for varying the pump displacement and direction of delivery, means establishing a normal position of rest for the control element in which the pump displacement is in the reverse direction, and a check valve connected in shunt to the pump and open to free flow in said reverse direction whereby the motor may be stopped without creep.

2. A hydraulic power transmission system comprising a reversible, variable displacement pump, a fluid motor, a closed circuit connecting the pump and motor, a shiftable control element for varying the pump displacement and direction of delivery, means establishing a normal position of rest for the control element in which the pump displacement is in the reverse direction, a check valve connected in shunt to the pump and open to free flow in said reverse direction, and means for variably biasing the check valve to closed position whereby the motor may be braked, stopped without creep or operated in a reverse direction by adjustment of the check valve biasing means while the pump control element is in its position of rest.

3. A hydraulic power transmission system comprising a reversible, variable displacement pump, a fluid motor, a closed circuit connecting the pump and motor, a shiftable control element for varying the pump displacement and direction of delivery, means for limiting the movement of the control element to a small amount in the reverse direction, and a check valve connected in shunt to the pump and open to free flow in said reverse direction whereby the motor may be stopped without creep.

4. A hydraulic power transmission system comprising a reversible, variable displacement pump, a fluid motor, a closed circuit connecting the pump and motor, a shiftable control element for varying the pump displacement and direction of delivery, means for limiting the movement of the control element to a small amount in the reverse direction, a check valve connected in shunt to the pump and open to free flow in said reverse direction and means for imposing resistance to the free flow through the check valve whereby the motor may be braked, stopped without creep or operated slowly in a reverse direction by operation of the last-named means while the pump control element is in its reverse displacement position.

JAMES ROBINSON.

REFERENCES CITED

The following references are of record in the file of this patent:

UNITED STATES PATENTS

| Number | Name | Date |
|---|---|---|
| 2,205,647 | Ferris | June 25, 1940 |
| 2,232,428 | Benedek | Feb. 18, 1941 |